United States Patent [19]

Efinger et al.

[11] 4,256,938

[45] Mar. 17, 1981

[54] ELECTRICAL CONTROL DEVICE FOR HIGH AND LOW VOLTAGE INSTALLATIONS

[75] Inventors: Arnold Efinger, Trossingen; Erwin Moser, Karlsruhe-Rüppur, both of Fed. Rep. of Germany

[73] Assignee: Wickmann-Werke Böblingen GmbH, Bölingen, Fed. Rep. of Germany

[21] Appl. No.: 938,834

[22] Filed: Sep. 1, 1978

[30] Foreign Application Priority Data

Sep. 3, 1977 [DE] Fed. Rep. of Germany ..... 27398114

[51] Int. Cl.$^3$ .............................................. H01H 33/66
[52] U.S. Cl. ................................. 200/144 B; 200/302
[58] Field of Search ............... 200/144 R, 144 B, 5 R, 200/302, 304, 305, 150 R; 361/331, 332, 333; 174/12 R, 12 BH, 15 BH, 18, 13, 37; 339/9 R, 9 E, 111, 61R

[56] References Cited

U.S. PATENT DOCUMENTS

| 2,785,319 | 3/1957 | Simpson et al. ............... 174/37 X |
| 3,471,669 | 10/1969 | Curtis ................................. 200/302 |
| 3,522,404 | 8/1970 | Trayer ................................ 200/302 |
| 3,855,435 | 12/1974 | Himi ................................. 200/144 B |
| 4,124,790 | 11/1978 | Kumbera et al. .............. 200/144 B |

FOREIGN PATENT DOCUMENTS 2402472  8/1974 Fed. Rep. of Germany .

Primary Examiner—James R. Scott
Attorney, Agent, or Firm—Becker & Becker, Inc.

[57] ABSTRACT

An electrical control device for high and low voltage installations with at least one switch including a stationary contact fastened to a connecting part of an insulated feed or supply line and also comprising a movable counter contact operable by way of an insulating body and connected to the flexible inner conductor of a likewise insulated cable connecting member. The connecting part of the insulated supply line, the above mentioned switch, the cable connecting member, and the insulating body are encased by a tightly sealing common cover or envelope including a bellows having at least one annular fold and being operable to absorb the control movements of the insulating body. The aforementioned cover or envelope has an electrically insulating inner layer and an electrically conductive outer layer for the ground potential.

12 Claims, 4 Drawing Figures

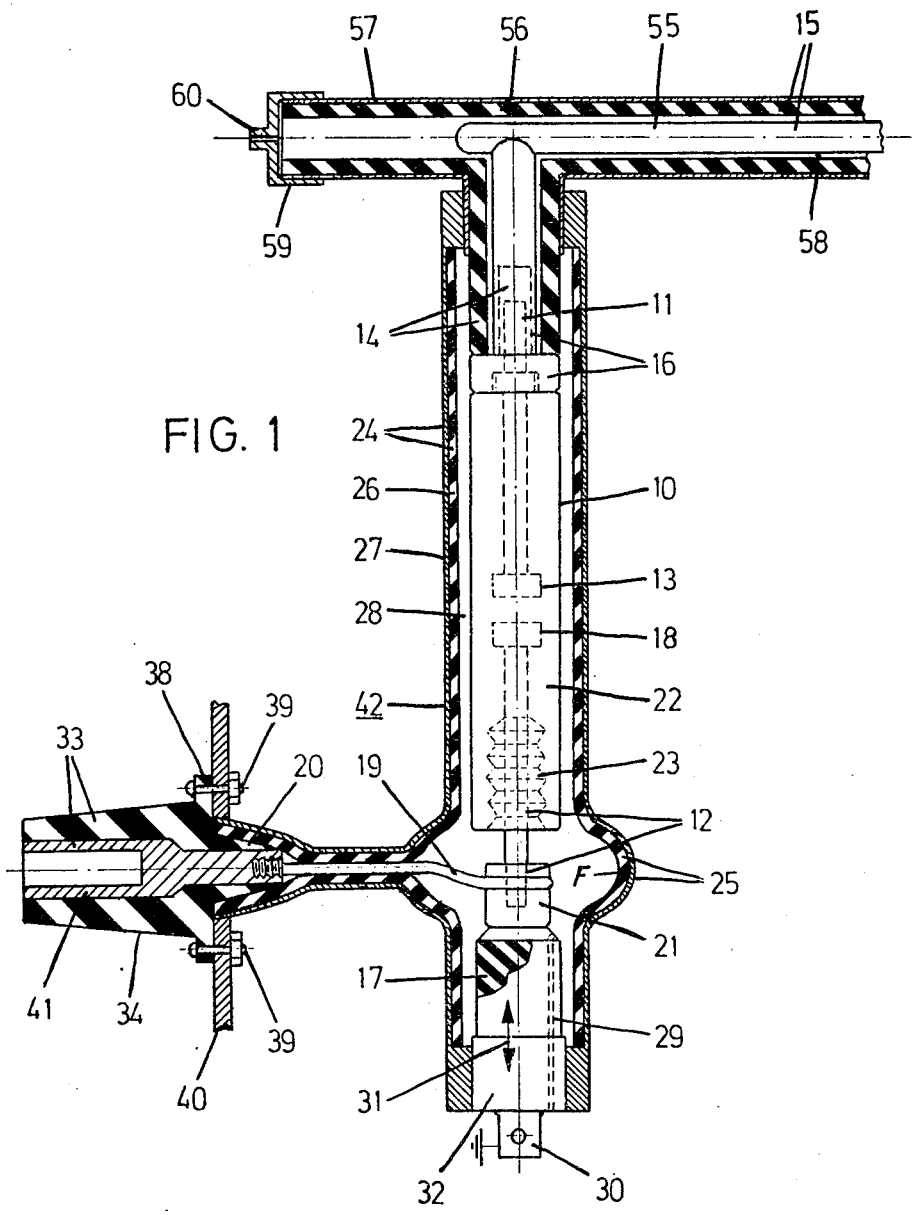

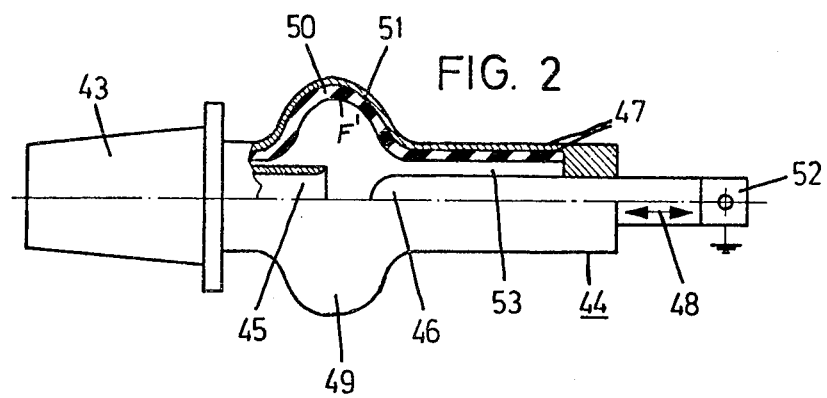
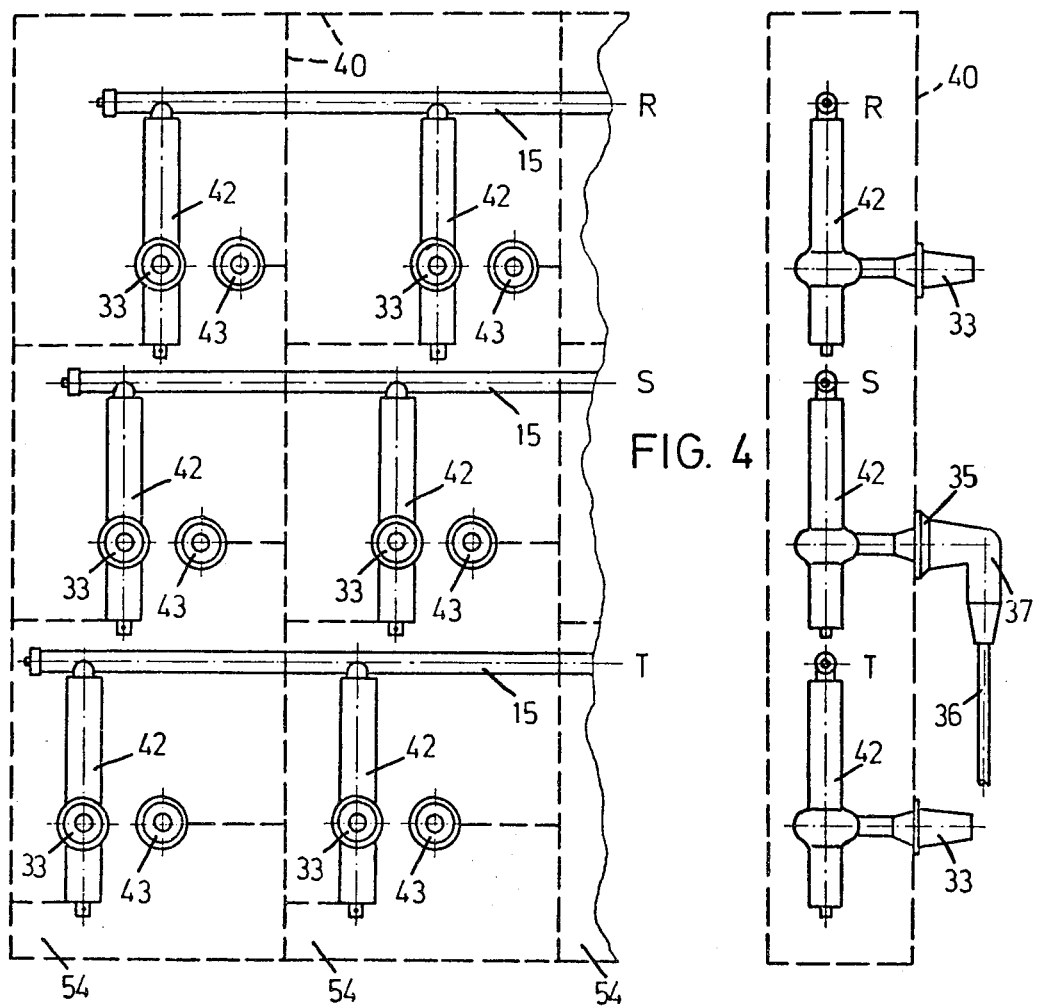

ns, can not be
ELECTRICAL CONTROL DEVICE FOR HIGH AND LOW VOLTAGE INSTALLATIONS

BACKGROUND OF THE INVENTION

The present invention relates to an electric control device for high voltage and low voltage with at least one switch having a stationary contact fastened to a connecting butt of an insulated supply line while the movable counter contact adapted to be actuated by means of an insulated body is connected with a flexible inner conductor of a likewise insulated cable connecting piece.

Control devices of the above mentioned type have become known in which each built-in switch by way of a container preferably filled with a combined extinguishing and insulating means is protected against having its operation affected by outer soiling, water and other ecological conditions. Even when completely insulated, these containers however, especially when high voltage or high tension is involved, can not be contacted without danger because the surface accessible to contact are not designed for receiving the ground potential. Therefore, additionally protective boxes, tanks, grilles or the like are necessary which greatly increase the cost of the control device and the space requirement thereof and furthermore make servicing operations and installations more difficult.

It is, therefore, an object of the present invention to provide a control device of the above mentioned general type which can be contacted without danger, will permit a small overall design, will be low in manufacturing costs, will avoid servicing operations, and will permit any desired installation position while each built-in switch as to its performance data will not be affected by outer soiling, water and other ecological conditions.

These and other objects and advantages of the invention will appear more clearly from the following specification in connection with the accompanying drawings, in which:

IN THE DRAWINGS

FIG. 1 is a longitudinal section through the base element comprising a switch and designed in accordance with the present invention.

FIG. 2 is a partial view and partial longitudinal section through a grounding switch associated with the base element.

FIG. 3 is a front view of a switchboard combining a plurality of three-phase switches.

FIG. 4 is a side view of the switchboard of FIG. 3.

BRIEF SUMMARY OF THE INVENTION

The electric control device according to the present invention is characterized primarily in that the connecting butt of the insulated feed line, the switch, the cable connecting piece, and the insulating body are enclosed by a tightly sealing, shared or joint electrically isolating envelope with a bellows absorbing the control movements of the insulating body and consisting of at least one annular sleeve fold. The sleeve fold comprises an electrically insulating inner layer and an electrically conductive outer layer for the ground potential.

Inasmuch as the bellows absorbing the control movements of the insulating body represents only a small portion of the tightly enclosing sleeve, particularly little space is required for encapsuling the control device. Each individual switch is so-to-speak included into the electric conductor so that the control device will have the character of a cap and will be particularly suitable for under-floor stations where also an uninterrupted operation is required even if a flooding occurs. In view of the electrically conductive outer layer of the sleeve provided with the bellows, it is possible, for instance by means of clamps to effect groundings practically at any desired spots, and within the region of the control device accessible to a manual contact, potential equality is assured. The advantages realized by the present invention consist also especially in that protective boxes, tanks or grilles as well as insulators of porcelain, which affect the installation possibilities, are avoided.

DETAILED DESCRIPTION

Referring now to the drawings in detail, the switch 10 utilized in the control device shown in the drawing represents a structural element preferably a so-called vacuum switch, which is hermetically encapsuled with the exception of its two contact terminals 11 and 12. Such vacuum switch is intended to keep the difference in behavior particularly low between different installation positions. Such vacuum switch in addition to its high lifespan is supposed to further reduce the necessity of servicing the control device.

The terminal 11 of the stationary contact 13 by way of a sleeve 16 is screwed onto the connecting piece 14 of the insulated feed line 15. The terminal 12 of the movable counter contact 18 adapted to be actuated by the insulating body 17 is connected to the flexible inner conductor 19 of the likewise insulated cable connecting piece 20 by means of a bolt 21 inserted into the insulating body 17. For purposes of sealing its control chamber 22, the switch 10 at its end face is provided with an insert 23 in the form of a bellows which surrounds the movable counter contact 18.

The control device according to the invention is very advantageous primarily due to the fact that the connecting piece 14 of the insulated feed line 15, the switch 10, the cable connecting piece 20, and the insulating body 17 are enclosed by a common tightly sealing sleeve 24 with a bellows 25 which absorbs the switch movements of the insulating body 17 and consists at least of an annular sleeve fold F. The fold has an electrically insulating inner layer 26 and electrical conductive outer layer 27 for the ground potential. In order to permit a particularly economical manufacture and installation of the sleeve 24, sleeve 24 is elastic throughout and is connected to the connecting member 14 of the insulated feed line 15, to the cable connecting piece 20, and to the insulating body 17 whereby in addition to a high mobility also a stable structure will be assured.

For purposes of avoiding destructive spray phenomena, below, i.e. inside the sleeve 24 there is provided a filling 28 comprising a liquid or a gaseous insulating substance. The filling 28 is introduced through a passage 29 provided in the insulating body 17, which passage starts adjacent to the connecting eye 30 for the operating mechanism of the switching device (not shown in the drawing) and ends within the region of the bellows 25. The axial control movement of the insulating body 17 provided for actuating the counter contact 18, is illustrated by the double arrow 31. As further improvement of the contact safety, there may be mentioned that those portions of the insulated feed line 15 which projects from sleeve 24, of the insulated cable connecting piece 20, and of the insulating body 17, all comprise an electrically conductive outer layer 32 for the ground potential.

Due to the fact that the cable connecting piece 20 ends as a socket 33, the miniature structure is further improved and the universal usefulness of the control device is broadened. Thus, a cable separating area is obtained which has a relatively short distance from the switch 10 of the control device. In order also in this connection to exclude operational failures caused by water as they might occur in particular in under-floor stations, the plug receiving socket 33 shown in section in FIG. 1 has an insulated cone 34 adapted to receive a tightly connecting plug sleeve 35 as shown in FIG. 4 herein. According to the embodiment illustrated in FIG. 4 for the connection of a cable 36, there is provided a space saving angle plug 37 which can be replaced by a plug of a different shape provided with an electrically conductive outer layer. The cable connecting member 20 is connected to a frame 40 in the flange region 38 by means of screws 39. The frame 40 has ground potential and comprises an electrically conductive passage which is arranged in the insulated cone 34 as a central socket 41 and continues toward the other side in the form of a screwed-on flexible inner conductor 19 of the cable connecting member 20.

All foregoing advantages of the control device according to the invention are further increased when in accordance with FIGS. 3 and 4, the sleeve 24 is provided in triplicate for three pole switches 42 adapted to be actuated in common and pertaining to a three-phase system R, S, T, and when the electrically conductive outer layer of each of the three sleeves 24 is in a potential manner connected to the frame 40 fixing the position of the pole switches 42 relative to each other. A visible separating distance and a further safety improvement inherent thereto will be obtained by the fact that laterally adjacent the socket 33 of each cable connecting member 20 there is provided a second plug receiving socket 43 for depositing or settling the plug 37 withdrawn from the first socket 33.

The second socket 43 for additionally improving the safety provisions is arranged as a grounding switch 44 according to FIG. 2. The stationary contact 45 of switch 44 and its movable counter contact 46 are similar to the pole switch 42 enclosed by a bellows 49 which absorbs the switch movements 48 of the movable counter contact 46 and consists at least of one annular sleeve fold which has an electrically insulating inner layer 50 and an electrically conductive outer layer 51 for ground potential.

The steps taken in connection with the above mentioned joint switch are consequently applied to the additionally provided grounding switch 44. The grounding switch 44 is actuated by the axial displacement 48 of the connecting eye 52 for the driving device not shown in the drawing with the connecting eye projecting at the end face of the sleeve 47.

Only after the plug 37 has been moved from the first socket 33 to the second socket 43, the grounding switch is closed in order on one hand to avoid discharging operations during the handling of the plug 37, and on the other hand to avoid spark formation within the region of the socket 43. Within the sleeve 47, care is taken against destructive spray phenomena. To this end, a filling 53 of liquid or gaseous insulating material is provided in said sleeve 47.

Furthermore, in the control device according to the invention, two or more three-phase switches 54 which comprise three pole switches 42 are arranged adjacent to each other so as to form a control panel. As feed lines 15, a total of three collector rails with a central conductor 55, an insulating mantle 56, and an electrically conductive outer layer or liner 57 for ground potential are provided. All pole switches 42, grounding switches 44, and sockets 33 and 43 each in planar offset arrangement are provided. The control device is thus particularly suitable for transformers and/or distributor stations in current supply devices. For the encapsuling, extremely small space is required inasmuch as it is separately arranged on each base element of the device, which base element contains a switch. The control movements in the region of the bellows is followed by said encapsuling structure so that in view of the ground potential prevailing everywhere at the outer surfaces accessible to mantle contact, an expensive outer insulation becomes superfluous. The inner insulation in this instance gaining in importance with each feed line 15 as the collector rail is again reinforced by a filling 58 consisting of a liquid or gaseous electrically insulating material. This filling can easily be introduced through a sealing connection 60 provided in the end cap 59 of the collector rail.

It is, of course, to be understood that the present invention is, by no means, limited to the specific showing in the drawings, but also comprises any modifications within the scope of the appended claims.

What is claimed is:

1. In combination with an electrical control device for high and low voltage installations, which includes at least one switch having a stationary contact, a connecting part having said stationary contact connected thereto and connected to an insulated current supply line, said switch also having a movable counter contact, an insulating body connected to said movable counter contact and subjected to control movements; a cable connecting member; and a flexible inner electric conductor connected to said movable contact by way of said insulating body, the improvement of a joint electrically isolating envelope therewith comprising a bellows having at least one annular fold and collectively tightly encasing said switch, said cable connecting member, and said insulating body; said bellows having at least the one annular fold being operable to absorb control movements exerted upon said insulating body; said envelope having an electrically insulating inner layer and an electrically conductive outer layer for the ground potential.

2. A device according to claim 1, in which said joint envelope is elastic throughout and is press fitted both onto said connecting part with said insulated current supply line and also onto said cable connecting member as well as onto said insulated body.

3. A device according to claim 1, in which said switch has two contact connections and with the exception of said two contact connections being an encapsuled structural member.

4. A device according to claim 1, which includes a filling of a fluid insulating substance provided within said joint envelope.

5. A device according to claim 1, in which said bellows with said annular fold is located within a region between said switch and said insulating body.

6. A device according to claim 1, in which from said envelope there project protruding portions of said insulated current supply line and of said insulated cable connecting member as well as of said insulating body, and in which all of said protruding portions collectively are covered by an electrically conductive outer layer for a ground potential.

7. A device according to claim 1, in which said cable connecting member terminates with a socket section.

8. A device according to claim 7, in which said socket section comprises a cone of insulating material overlapped and tightly sealingly engaged by a plug sleeve.

9. A device according to claim 1, in which said joint electrically isolating envelope concurrently forms a triple enveloping system for three pole switches of a three-phase system which pole switches are adapted to be actuated together, and in which frame means are provided maintaining the position of said pole switches relative to each other, said electrically conductive outer layer of said enveloping system being electrically potentialwise connected to said frame means.

10. A device according to claim 7, in which laterally of and adjacent to said socket section there is arranged an additional socket section for receiving the plug withdrawn from said first mentioned socket.

11. A device according to claim 10, in which said additional socket includes a ground switch having a stationary contact and a movable contact enclosed by a tightly sealing joint envelope comprising a bellows having at least one annular fold with an electrically insulating inner layer and an electrically conductive outer layer for the ground potential.

12. A device according to claim 11, which includes a plurality of three-phase switches arranged as a switch block with each three-phase switch comprising three pole switches, and also includes supply lines formed by three collecting rails with a central conductor and an insulating mantle and an electrically conductive outer layer for the ground potential, said pole switches and ground switches and sockets respectively being located in a planar offset manner with regard to each other.

* * * * *